May 30, 1939.   J. R. KINGSTON ET AL   2,160,218
COMBUSTION-PRODUCT ENGINE
Filed Aug. 2, 1937
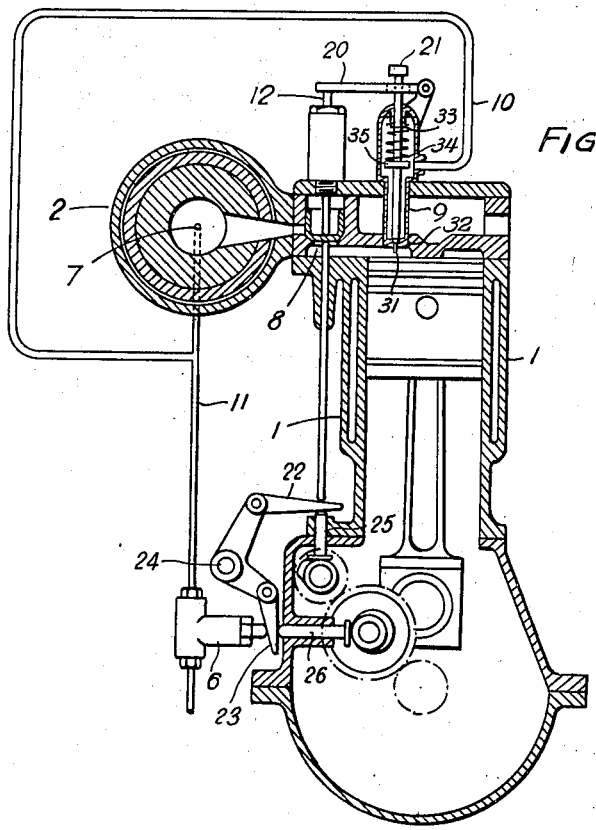
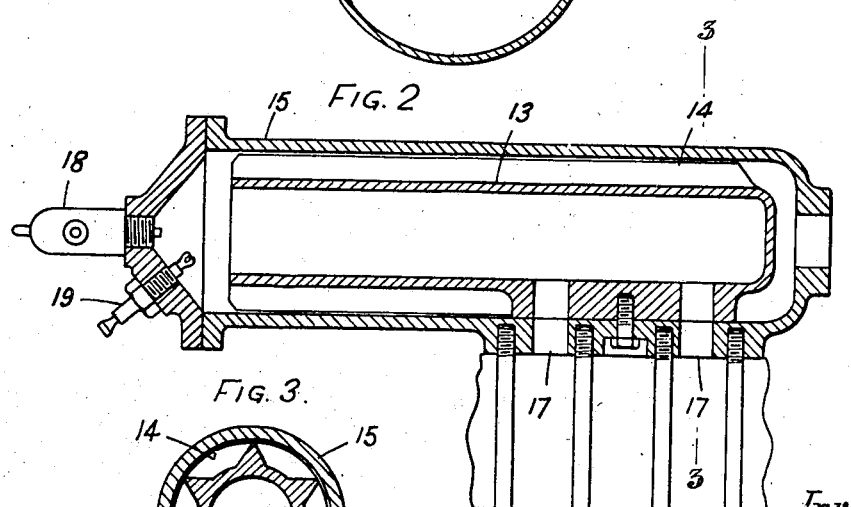
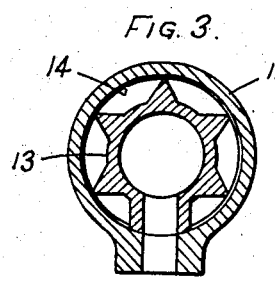
Inventors
John R. Kingston
and William H. Powell
by Wilkinson & Mawhinney
Attorneys.

Patented May 30, 1939

2,160,218

UNITED STATES PATENT OFFICE 2,160,218

COMBUSTION-PRODUCT ENGINE

John Rudolph Kingston and William Henry Powell, London, England

Application August 2, 1937, Serial No. 157,040
In Great Britain September 10, 1936

3 Claims. (Cl. 60—44)

This invention relates to combustion product engines of the kind wherein the air for combustion is compressed in one or more stages and delivered to an external combustion chamber, the whole of the air for combustion passing through the said chamber. An example of such an engine is shown in the specification of British Letters Patent No. 246,692 dated March 23, 1925.

The invention has for its object to enable an engine of this type using coal oils, creosote, and low grade furnace or fuel oils generally, to be constructed of comparatively small size and weight so that it may be used particularly for road transport vehicles.

The attempt to overcome these disabilities by the use of very high compression pressures of about 40 atmospheres results in a very heavy and costly engine and is therefore impracticable, as the maximum explosive pressures exceed 70 atmospheres to give a mean effective pressure of about 7 atmospheres.

According to the invention, the above-mentioned object is effected by the addition of auxiliary injectors which supply fuel into the excess air contained in the products of combustion which pass from the external combustion chamber into each power cylinder of the engine. These auxiliary injectors are similar to those at present in use on high speed compression-ignition engines.

Owing to the comparatively low temperature a light heat resisting steel or nickel-chromium liner may be used for the combustion chamber.

To enable the invention to be fully understood, it will now be described with reference to the accompanying drawing in which:

Fig. 1 is a sectional elevation showing the combustion chamber and power cylinder of an engine having the invention applied thereto.

Fig. 2 is a view showing an alternative arrangement of combustion chamber with metal liner in horizontal section, and Fig. 3 is a cross section on the line 3—3 of Fig. 2.

In Fig. 1 the power cylinder 1 of the engine is shown with a separate external combustion chamber 2. The means for compressing the working fluid are not shown as they are well known and form no part of the present invention. A fuel pump is shown at 6 and 7 is the fuel sprayer in the combustion chamber, 8 the inlet valve to the power cylinder and 9 is the auxiliary fuel sprayer or injector according to the invention which is supplied through the connection 10 from the pipe 11. The injector 9 is of a usual pattern and comprises the valve spindle 21 having a needle 31 at one end controlling the inlet orifice 32 in the casing 9, the spindle being slidably mounted in the bushing 33 and controlled by a spring 34 which bears against the top of the casing and against the abutment 35 on the spindle.

In the arrangement shown which operates on the so-called "common rail" system, the auxiliary fuel injector 9 is actuated by a lever 20 operated by an extension of the inlet valve spindle 12. There is a clearance between the spindle 21 of the injector 9 and the lever 20, the arrangement being such that the spindle 21 is only raised when the lever is at the upper limit of its movement, i. e., under full load. For light load the lift of the spindle 12 may be reduced by any suitable means so that the lever 20 does not make contact with the spindle 21 and so the auxiliary injector is not operated. In the example shown the lift of the spindle 12 is altered together with the adjustment of the stroke of the fuel pump 6 to control the speed of the engine by means of the wedges 22, 23 pivotally mounted on a rock shaft 24 and interposed between the control rods of the inlet valve and fuel pump and the operating members 25, 26. By moving the rock shaft the positions of the wedges relative to the valve and pump rods are altered simultaneously.

In the engine illustrated about one third of the fuel supply is required for the combustion chamber fuel injector and two thirds for the auxiliary fuel injectors at full power.

Referring to Figs. 2 and 3 which show an alternative arrangement of combustion chamber suitable for use with the auxiliary injector referred to, 13 is a metal liner made of heat-resisting steel or an alloy such as nickel-chromium, surrounded by one or more layers 14 of metal foil such as aluminium foil with asbestos paper or other resilient non-conducting material between each layer to obviate radiation loss, and enclosed in a steel or like container 15. The ports to the power cylinders are indicated at 17. The fuel injector is indicated at 18 and the electrical glow plug for igniting the fuel when starting from cold at 19.

With regard to the timing of the auxiliary fuel injection, this takes place at full load during the admission of the hot combustion products, the turbulence of which ensures complete combustion, somewhat similar to the blast air used in some Diesel engines.

From a purely theoretical point of view, it is advantageous to continue the auxiliary fuel injection even after the inlet valves are closed, thus approximating to isothermal combustion. The practical objection, however, to a protracted injection is the increased loss of heat by radiation to the cylinder water jacket.

We claim:

1. In a combustion product engine and in combination an external combustion chamber, a power cylinder in communication therewith, a main fuel injector for the combustion chamber, an auxiliary fuel injector supplying fuel into the excess air contained in the products of combustion which pass from the combustion chamber to the power cylinder, and a fuel pump supplying fuel to the main injector and to the auxiliary injector, the auxiliary injector being operated by an extension of the rod operating the inlet valve to the power cylinder.

2. In a combustion product engine and in combination with an external combustion chamber, a power cylinder, a passage connecting the combustion chamber and the power cylinder, an inlet valve in said passage, a rod operating said inlet valve, cam mechanism operating said rod driven by the engine, a fuel pump, a main fuel injector for the combustion chamber, an auxiliary fuel injector supplying fuel into the excess air contained in the products of combustion admitted to the power cylinder, an operating spindle for the auxiliary injector, and a lever pivoted to a part of the auxiliary injector and in contact with the rod operating the inlet valve for operating the spindle of the auxiliary injector.

3. In a combustion product engine according to claim 2 the provision of a rock shaft, pivoted wedges on said rock shaft, said wedges being interposed between the control rods of the inlet valve and the fuel pump and the operating members thereof so that when the rock shaft is moved the wedges alter the lift of the valve and the stroke of the fuel pump simultaneously.

JOHN RUDOLPH KINGSTON.
WILLIAM HENRY POWELL.